(12) United States Patent
Leinweber et al.

(10) Patent No.: US 7,569,615 B2
(45) Date of Patent: Aug. 4, 2009

(54) ALKOXYLATED DENDRIMERS AND USE THEREOF AS BIODEGRADABLE DEMULSIFIERS

(75) Inventors: Dirk Leinweber, Schwalbach (DE); Michael Feustel, Koengernheim (DE); Elisabeth Wasmund, Burgkirchen (DE); Heidi Rausch, Garching/Alz (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 615 days.

(21) Appl. No.: 10/562,097

(22) PCT Filed: Jun. 19, 2004

(86) PCT No.: PCT/EP2004/006651

§ 371 (c)(1), (2), (4) Date: Dec. 21, 2005

(87) PCT Pub. No.: WO2005/003260

PCT Pub. Date: Jan. 13, 2005

(65) Prior Publication Data

US 2007/0100002 A1    May 3, 2007

(30) Foreign Application Priority Data

Jul. 2, 2003    (DE)    ................. 103 29 723

(51) Int. Cl.
*B01D 17/05*    (2006.01)
*C10G 33/04*    (2006.01)

(52) U.S. Cl. ................. 516/181; 516/182; 516/183; 516/184; 516/185; 516/186; 516/187; 516/188; 516/189; 516/190; 516/191; 210/708; 524/437

(58) Field of Classification Search ......... 516/181–191; 210/708; 524/437
See application file for complete search history.

(56) References Cited

U.S. PATENT DOCUMENTS

| | | |
|---|---|---|
| 4,321,146 A | 3/1982 | McCoy |
| 4,558,120 A | 12/1985 | Tomalia |
| 4,737,550 A | 4/1988 | Tomalia |
| 5,418,301 A * | 5/1995 | Hult et al. ............ 525/437 |
| 5,445,765 A | 8/1995 | Elfers |
| 5,759,406 A | 6/1998 | Phelps |
| 5,981,687 A | 11/1999 | Breen |
| 6,114,458 A | 9/2000 | Hawker |
| 6,310,106 B1 * | 10/2001 | Podubrin et al. ........ 516/189 |
| 2005/0131205 A1 | 6/2005 | Haeggman |
| 2005/0203193 A1 * | 9/2005 | Leinweber et al. ...... 516/189 |

FOREIGN PATENT DOCUMENTS

WO    WO 03/062306    7/2003

OTHER PUBLICATIONS

International Preliminary Report on Patentability, PCT/EP2004006651, May 2006.

* cited by examiner

*Primary Examiner*—Ling-Siu Choi
*Assistant Examiner*—Chun-Cheng Wang
(74) *Attorney, Agent, or Firm*—Richard P. Silverman

(57) ABSTRACT

Disclosed is the use of alkoxylated dendrimers for breaking oil/water emulsions. The alkoxylated dendrimers have a molecular weight of from 2400 to 100 000 g/mol and have been alkoxylated with $C_2$-$C_4$-alkylene oxide groups or a mixture of such alkylene oxide groups such that the alkoxylated dendrimer has a degree of alkoxylation of from 1 to 100 alkylene oxide units per free OH group. The alkoxylated dendrimers are added to the oil/water emulsions in amounts of from 0.0001 to 5% by weight, based on the oil content of the emulsion to be demulsified.

8 Claims, No Drawings

ALKOXYLATED DENDRIMERS AND USE THEREOF AS BIODEGRADABLE DEMULSIFIERS

The present invention relates to the use of alkoxylated dendrimers for breaking water-oil emulsions, in particular in the production of crude oil.

During its recovery, crude oil is produced as an emulsion with water. Before the crude oil is further processed, these crude oil emulsions must be broken into the oil fraction and the water fraction. For this purpose, use is generally made of petroleum demulsifiers. Petroleum demulsifiers are surface-active polymeric compounds which are able to effect the required separation of the emulsion constituents within a short time.

Petroleum demulsifiers disclosed in U.S. Pat. No. 4,321,146 are alkylene oxide block copolymers and in U.S. Pat. No. 5,445,765 are alkoxylated polyethyleneimines. These can be used as individual components, in mixtures with other demulsifiers, or else as crosslinked products. Crosslinkings are carried out, for example, by means of reactions with alkoxylated low molecular weight alcohols (such as, for example, glycerol or pentaerythritol) or alkoxylated alkylphenol formaldehyde resins with bifunctional compounds such as diepoxides or diisocyanates. Such crosslinked compounds are disclosed in U.S. Pat. Nos. 5,759,409 and 5,981,687.

U.S. Pat. Nos. 4,558,120 and 4,737,550 describe narrowly meshed star-shaped polymers (amidoamine dendrimers) which can be used as water-soluble demulsifiers (more accurately: deoilers) for crude oil/water emulsions. These products were neither alkoxylated nor used for breaking water/crude oil emulsions.

The use of alkoxylated, alkylated and esterified dendritic polyesters (in particular Boltorns® from Perstorp) is described in U.S. Pat. No. 6,114,458. The products are reportedly suitable, inter alia, as curing agents for heat-curing resins, as viscosity modifiers for linear polymers or as stabilizers for suspensions and emulsions.

The varying properties (e.g. asphaltene, paraffin and salt content, chemical composition of the natural emulsifiers) and proportions of water in different crude oils make it imperative to further develop the existing petroleum demulsifiers. In particular, a low concentration and broad applicability of the petroleum demulsifiers to be used as well as the higher effectiveness which is to be strived for is of prime importance from an economic and ecological point of view. In addition, demulsifiers are increasingly required which have good biodegradability and low bioaccumulation in order to replace the controversial products based on alkylphenol.

The object was thus to develop novel alkylphenol-free petroleum demulsifiers which are superior in their effect to the products already known, can be used in an even lower concentration and have better biodegradability.

Surprisingly, it has been found that alkoxylated dendritic polyesters (dendrimers) exhibit an excellent effect as petroleum demulsifiers even at a very low concentration. In addition, they have exhibited significantly better biodegradabilities in accordance with OECD 306 compared to many conventional commercial demulsifiers.

The invention therefore provides for the use of alkoxylated dendrimers having a molecular weight of from 2400 to 100 000 g/mol which have been alkoxylated with $C_2$-$C_4$-alkylene oxide groups or a mixture of such alkylene oxide groups such that the alkoxylated dendrimer has a degree of alkoxylation of from 1 to 100 alkylene oxide units per free OH group, for breaking oil/water emulsions, in amounts of from 0.0001 to 5% by weight, based on the oil content of the emulsion to be broken.

These alkoxylated dendrimers are preferably obtainable from dendrimers by alkoxylation of the free OH groups with a $C_2$-$C_4$-alkylene oxide or a mixture of such alkylene oxides in a molar excess so that the alkoxylated dendrimer has the specified degree of alkoxylation. Dendrimers are also commercially available. Particular preference is given to using Boltorn® H2O and H310 (Perstorp).

The preparation and the molecular structures of the dendrimers used according to the invention are described comprehensively in U.S. Pat. No. 5,418,301. These are dendritic polyesters which are constructed from a central starting molecule (generally a diol or polyol) and subsequent successive multiple esterification with a carboxylic acid having two further reactive groups (such as, for example, dimethylolpropanoic acid). FIG. 1 shows the reaction principle.

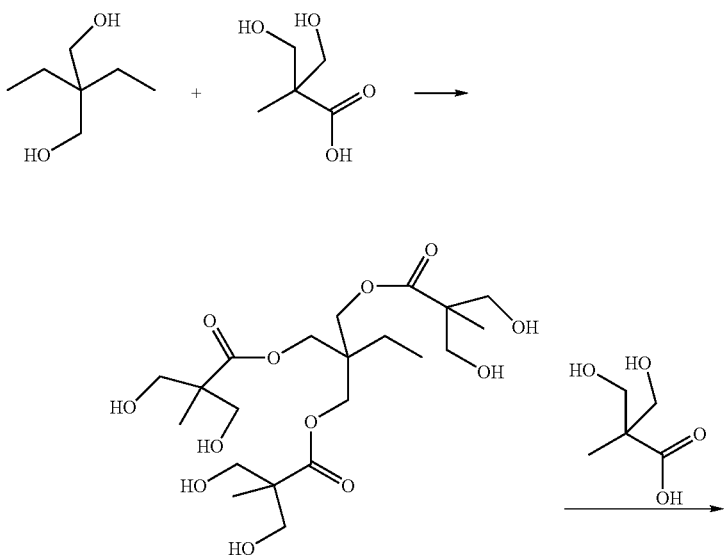

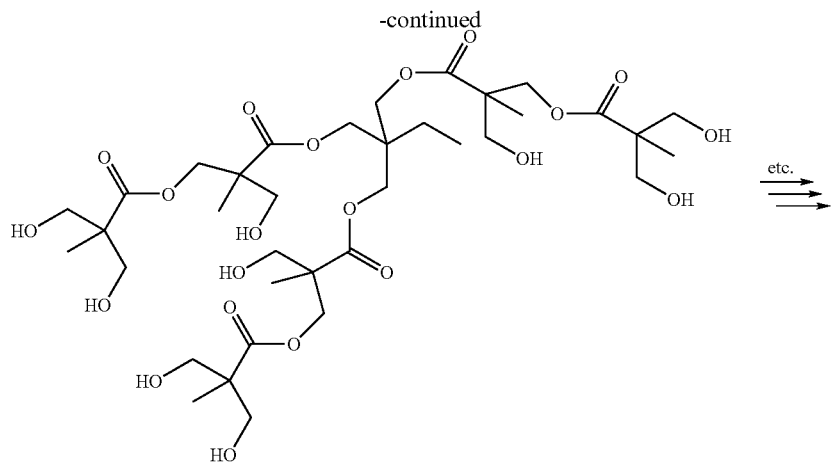

FIG. 1: Synthesis in principle of dendritic polyesters by reaction of trimethylolpropane and 2,2-dimethylolpropanoic acid The dendrimers used for the alkoxylation are dendritic polyesters, in general based on a mono-, di- or polyfunctional starting alcohol and a carboxylic acid which has as least two hydroxyl groups as dendritic growth component. The starting alcohol used is preferably bis(trimethylolpropane), bis(trimethylolethane), dipentaerythritol, pentaerythritol, alkoxylated pentaerythritol, trimethylolethane, trimethylolpropane, alkoxylated trimethylolpropane, glycerol, diglycerol, triglycerol, polyglycerol, neopentyl glycol, dimethylolpropane, sorbitol or mannitol.

The carboxylic acid which leads to the dendritic chain growth is preferably dimethylolpropanoic acid, α,α-bis(hydroxymethyl)butanoic acid, α,α,α-tris(hydroxymethyl)ethanoic acid, α,α-bis(hydroxymethyl)pentanoic acid, α,α-bis(hydroxy)propanoic acid or 3,5-dihydroxybenzoic acid.

The star-shaped monodisperse dendrimers are alkoxylated with one or more $C_2$-$C_4$-alkylene oxides, preferably ethylene oxide (EO) or propylene oxide (PO). The alkoxylating agent is used in molar excess. As is known in the prior art, the alkoxylation takes place by reacting the dendrimers with an alkylene oxide under elevated pressure of generally 1.1 to 20 bar at temperatures of from 50 to 200° C. The alkoxylation takes place at the free OH groups of the dendrimers. The amount of alkylene oxide used is such that the average degree of alkoxylation is between 1 and 100 alkylene oxide units per free OH group. Average degree of alkoxylation is understood here as meaning the average number of alkoxy units which is attached to each free OH group. It is preferably 2 to 70, in particular 5 to 50, specifically 20 to 40.

Preferably, the alkoxylation is carried out firstly with PO and then with EO. The ratio of EO to PO in the alkoxylated dendrimer is preferably between 1:1 and 1:10, in particular 1:2 to 1:10. According to the invention, however, the alkoxylation can also take place in the reverse order, firstly EO, then PO, or with a mixture of PO and EO.

The dendrimer obtained following alkoxylation preferably has a molecular weight of from 2400 to 80 000 units, in particular from 10 000 to 50 000 units, specifically 15 000 to 30 000.

The alkoxylated dendrimers prepared by the described process are reproduced by way of example on the basis of a dendrimer of trimethylolpropane and 2,2-dimethylolpropanoic acid by the following structure (formula 1):

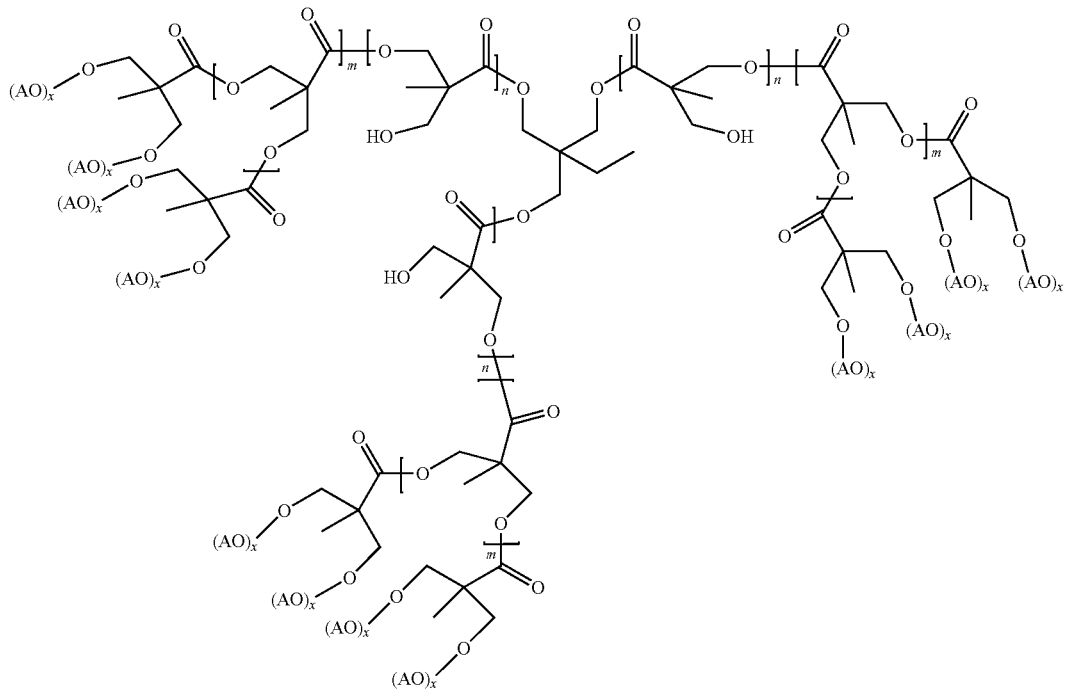

$(AO)_x$—O radicals are the alkoxylated OH groups, in which AO is a $C_2$-$C_4$-alkylene oxide unit and x is the degrees of alkoxylation. n and m are the corresponding degrees of condensation of 2,2-dimethylolpropanoic acid and are described in detail in U.S. Pat. No. 5,418,301.

A preferred subject-matter of the present invention is the use of the alkoxylated dendrimers as demulsifiers for oil/water emulsions in the recovery of petroleum.

According to the invention, the alkoxylated dendrimers for increasing the molecular weight and thus for improving the demulsifying properties can be reacted with multifunctional crosslinkers as is known in the prior art.

The following crosslinkers are particularly preferred:

bisphenol A diglycidyl ether, butane-1,4-diol diglycidyl ether, hexane-1,6-diol diglycidyl ether, ethylene glycol diglycidyl ether, cyclohexanedimethanol diglycidyl ether, resorcinol diglycidyl ether, glycerol diglycidyl ether, glycerol trglycidyl ether, glycerol propoxylate, triglycidyl ether, polyglycerol polyglycidyl ether, p-aminophenol triglycidyl ether, polypropylene glycol diglycidyl ether, pentaerythritol tetraglycidyl ether, sorbitol polyglycidyl ether, trimethylolpropane triglycidyl ether, castor oil triglycidyl ether, diaminobiphenyl tetraglycidyl ether, soya oil epoxide, adipic acid, maleic acid, phthalic acid, maleic anhydride, succinic anhydride, dodecylsuccinic anhydride, phthalic anhydride, trimellitic anhydride, pyromellitic anhydride, dimethoxydimethylsilane, diethoxydimethylsilane, tetraalkoxysilanes, toluene diisocyanate, diphenylmethane diisocyanate.

The specified crosslinkers and chemically related compounds are preferably used in the range from 0.1-10% by weight, particularly preferably 0.5-5% by weight and specifically 1.0-2.5% by weight, based on the alkoxylated dendrimer.

For use as petroleum demulsifiers, the alkoxylated dendrimers are added to the water/oil emulsions, which preferably takes place in solution. Preferred solvents for the alkoxylated dendrimers are paraffinic or aromatic solvents. The crosslinked alkoxylated dendrimers are used in amounts of from 0.0001 to 5% by weight, preferably 0.0005 to 2% by weight, in particular 0.0008 to 1% by weight and specifically 0.001 to 0.1% by weight, based on the oil content of the emulsion to be broken.

General Experimental Procedures for the Alkoxylation

Ethylene Oxide

The dendrimers specified in the examples below were introduced into a 1 l glass autoclave and the pressure in the autoclave was adjusted to about 0.2 bar above atmospheric pressure with nitrogen. It was slowly heated to 140° C. and, after reaching this temperature, the pressure was again adjusted to 0.2 bar above atmospheric pressure. Then, at 140° C., the desired amount of EO (see examples) was metered in, during which the pressure should not exceed 4.5 bar. When the EO addition was complete, the mixture was left to after-react for a further 30 minutes at 140° C.

Propylene Oxide

The dendrimers specified in the examples below were introduced into a 1 l glass autoclave and the pressure in the autoclave was adjusted to about 0.2 bar above atmospheric pressure with nitrogen. It was slowly heated to 130° C. and, after reaching this temperature, the pressure was again adjusted to 0.2 bar above atmospheric pressure. Then, at 130° C., the desired amount of PO was metered in (see examples), during which the pressure should not exceed 4.0 bar. When the PO addition was complete, the mixture was left to after-react for a further 30 minutes at 130° C.

The degree of alkoxylation was determined by means of $^{13}C$ NMR. This determination method should always be used for the purposes of the present invention.

Boltorn® H20 and Boltorn® H310 are dendrimers of a dihydroxycarboxylic acid and a polyol.

EXAMPLES

Example 1

Boltorn® H20+10 mol PO/OH+5 mol EO/OH (average molar mass according to GPC about 11 500 g/mol)

Example 2

Boltorn® H20+20 mol PO/OH+10 mol EO/OH (average molar mass according to GPC about 22 900 g/mol)

Example 3

Boltorn® H20+10 mol EO/OH+10 mol PO/OH (average molar mass according to GPC about 15 200 g/mol)

Example 4

Boltorn® H20+[10 mol EO/OH+10 mol PO/OH] mixture (average molar mass according to GPC about 15 600 g/mol)

Example 5

Boltorn® H20+40 mol PO/OH+20 mol EO/OH (average molar mass according to GPC about 47 500 g/mol)

Example 6

Boltorn® H310+20 mol PO/OH+10 mol EO/OH (average molar mass according to GPC about 39 600 g/mol)

Example 7

Boltorn® H310+[20 mol PO/OH+10 mol EO/OH] mixture (average molar mass according to GPC about 40 200 g/mol)

Example 8

Boltorn® H310+20 mol PO/OH+20 mol EO/OH (average molar mass according to GPC about 53 500 g/mol)

Example 9

Boltorn® H310+10 mol EO/OH+10 mol PO/OH (average molar mass according to GPC about 27 100 g/mol)

Example 10

Crosslinking the Alkoxylated Dendrimer From Example 1 With Bisphenol A Diglycidyl Ether In a 250 ml three-necked flask with contact thermometer, stirrer and reflux condenser, 100 g of alkoxylated dendrimer were heated to 80° C. with gentle nitrogen flushing. At this temperature, 2.5 g of bisphenol A diglycidyl ether (80% strength solution in an aromatic solvent) were quickly added dropwise. The reaction temperature was then increased to 120° C. and the reaction mixture was stirred for 8 h until unreacted diglycidyl ether could no longer be detected by means of titration of the epoxy number. The product was evaporated to dryness on a rotary evaporator (yield: 101.9 g)

and the molar mass was analyzed by means of GPC (M*≈18 200 g/mol, standard polyethylene glycol).

Example 11

Crosslinking the Alkoxylated Dendrimer From Example 1 With Dodecylsuccinic Anhydride In a 250 ml three-necked flask with contact thermometer, stirrer and water separator, 100.0 g of alkoxylated dendrimer, 1.5 g of alkylbenzenesulfonic acid and 3.5 g of dodecylsuccinic anhydride were initially introduced at room temperature. The reaction mixture was then heated to 165° C. and stirred for a further 8 h at this temperature until no more water of reaction formed in the water separator (reaction control: acid number). The product was evaporated to dryness on a rotary evaporator (yield: 102.9 g) and the molar mass was analyzed by means of GPC (M*≈19 800 g/mol, standard polyethylene glycol).

Example 12

Crosslinking the Alkoxylated Dendrimer From Example 1 With Toluene 2,4-diisocyanate In a 250 ml three-necked flask with contact thermometer, stirrer and reflux condenser, 100.0 g of alkoxylated dendrimer were heated to 60° C. with gentle nitrogen flushing. Then, at this temperature, 3.0 g of toluene 2,4-diisocyanate were slowly added dropwise. The reaction temperature was increased to 100° C. and the reaction mixture was stirred for a further 8 h at this temperature (reaction control: isocyanate number). The product was evaporated to dryness on a rotary evaporator (yield: 102.8 g) and the molar mass was analyzed by means of GPC (M*≈21 400 g/mol, standard polyethylene glycol).

Determining the Breaking Effectiveness of Petroleum Demulsifiers

To determine the effectiveness of a demulsifier, the water separation from a crude oil emulsion per time, and also the dewatering and desalting of the oil were determined. For this, demulsifying glasses (tapered, graduated glass bottles with screw lids) were charged in each case with 100 ml of the crude oil emulsion, in each case a defined amount of the demulsifier was metered in just below the surface of the oil emulsion using a micropipette, and the demulsifier was mixed into the emulsion by intensive shaking. The demulsifying glasses were then placed into a conditioning bath (30° C. and 50° C.) and the water separation was monitored.

During demulsification and after it had finished, samples were taken from the oil from the upper section of the demulsifying glass (so-called top oil), and the water content was determined in accordance with. Karl Fischer and the salt content was determined conductometrically. In this way, it was possible to assess the novel demulsifiers according to water separation and also dewatering and desalting of the oil.

Breaking Effect of the Demulsifiers Described

| Origin of the crude oil emulsion: | Holzkirchen sonde 3, Germany |
|---|---|
| Water content of the emulsion: | 46% |
| Salt content of the emulsion: | 5% |
| Demulsification temperature: | 50° C. |

TABLE 1

Effectiveness of alkoxylated dendrimers as demulsifiers compared to standard products (concentration 20 ppm)

| | Water separation [ml] per time [min] | | | | | | | | | Water in the top oil [%] | Salt in the top oil [ppm] |
|---|---|---|---|---|---|---|---|---|---|---|---|
| | 5 | 10 | 20 | 30 | 45 | 60 | 90 | 120 | 180 | | |
| Product from 1 | 0 | 0 | 5 | 11 | 27 | 33 | 38 | 42 | 44 | 0.79 | 152 |
| Product from 2 | 1 | 4 | 10 | 16 | 35 | 42 | 45 | 45 | 45 | 0.40 | 98 |
| Product from 3 | 2 | 5 | 12 | 18 | 36 | 42 | 45 | 45 | 46 | 0.32 | 73 |
| Product from 4 | 2 | 5 | 13 | 19 | 37 | 43 | 45 | 45 | 45 | 0.38 | 68 |
| Product from 5 | 4 | 9 | 18 | 27 | 38 | 43 | 45 | 46 | 46 | 0.14 | 25 |
| Product from 6 | 1 | 5 | 12 | 18 | 34 | 42 | 44 | 44 | 45 | 0.58 | 94 |
| Product from 7 | 1 | 6 | 13 | 19 | 34 | 43 | 45 | 45 | 45 | 0.51 | 81 |
| Product from 8 | 2 | 8 | 17 | 28 | 39 | 44 | 45 | 46 | 46 | 0.27 | 31 |
| Product from 9 | 5 | 10 | 23 | 32 | 40 | 45 | 46 | 46 | 46 | 0.21 | 20 |
| Product from 10 | 4 | 9 | 23 | 34 | 42 | 45 | 45 | 46 | 46 | 0.27 | 32 |
| Product from 11 | 2 | 5 | 13 | 25 | 35 | 42 | 42 | 43 | 43 | 0.59 | 78 |
| Product from 12 | 3 | 10 | 24 | 32 | 40 | 45 | 45 | 45 | 46 | 0.15 | 22 |
| Standard 1: Dissolvan 1952 (comparison) | 0 | 0 | 3 | 6 | 10 | 17 | 23 | 28 | 32 | 1.59 | 420 |
| Standard 2: Dissolvan 4738 (comparison) | 0 | 0 | 0 | 4 | 10 | 24 | 33 | 39 | 39 | 0.92 | 205 |

TABLE 2

Biodegradability of alkoxylated dendrimers (closed bottle test in accordance with OECD 306) compared to standard products

| | Biodegradability [%] after | |
|---|---|---|
| | 14 days | 28 days |
| Product from 1 | 25.7 | 46.8 |
| Product from 6 | 32.9 | 55.6 |
| Product from 10 | 30.7 | 49.5 |
| Product from 12 | 45.7 | 62.5 |
| Standard: Dissolvan 1952 (comparison) | 4.0 | 9.3 |
| Standard: Dissolvan 4738 (comparison) | 19.8 | 26.3 |
| Reference (sodium benzoate) (comparison) | 61.7 | 82.4 |

The invention claimed is:

1. A method for demulsifying an oil/water emulsion, said method comprising adding an alkoxylated dendrimer to said oil/water emulsion in an amount from 0.0001 to 5% by weight, based on the oil content of the emulsion to be demulsified, said alkoxylated dendrimer being a dendritic polyester having a molecular weight of from 2400 to 100 000 g/mol, the molecular weight determined by GPC using polyethylene as standard, said dendritic polyester being alkoxylated with $C_2$-$C_4$-alkylene oxide groups or a mixture of $C_2$-$C_4$-alkylene oxide groups to provide the alkoxylated dendrimer with an average degree of alkoxylation of from 1 to 100 alkylene oxide units per free OH group, wherein the dendritic polyester has a starting alcohol and a dendritic growth component, said starting alcohol is selected from the group consisting of a mono-alcohol, di-alcohol, and polyfunctional alcohol, and the dendritic growth component is a carboxylic acid which has at least two hydroxyl groups.

2. The method of claim 1, where the starting alcohol is selected from the group consisting of bis(trimethylolpropane), bis(trimethylolethane), dipentaerythritol, pentaerythritol, alkoxylated pentaerythritol, trimethylolethane, trimethylolpropane, alkoxylated trimethylolpropane, glycerol, diglycerol, triglycerol, polyglycerol, neopentyl glycol, dimethylolpropane, sorbitol, and mannitol.

3. The method of claim 1, where the carboxylic acid is selected from the group consisting of dimethylolpropanoic acid, α,α-bis(hydroxymethyl)butanoic acid, α,α, α-tris(hydroxymethyl)ethanoic acid, α, α-bis(hydroxymethyl)pentanoic acid, α,α-bis(hydroxy)propanoic acid, and 3 5-dihydroxybenzoic acid.

4. The method of claim 1, wherein the molecular weight of the alkoxylated dendrimer is from 10 000 to 50 000 g/mol.

5. The method of claim 1, in which the average degree of alkoxylation is between 1 and 70 alkylene oxide units per free OH group.

6. The method of claim 1, in which the $C_2$-$C_4$-alkylene oxide is ethylene oxide or propylene oxide or a mixture thereof.

7. The method of claim 1, in which the mixture of $C_2$-$C_4$-alkylene oxide groups is a mixture of ethylene oxide and propylene oxide with a ratio from 1:2 to 1:10.

8. The method of claim 1, where the alkoxylated dendrimer is crosslinked with a crosslinker selected from the group consisting of bisphenol A diglycidyl ether, butane-1,4-diol diglycidyl ether, hexane-1,6-diol diglycidyl ether, ethylene glycol diglycidyl ether, cyclohexanedimethanol diglycidyl ether, resorcinol diglycidyl ether, glycerol diglycidyl ether, glycerol triglycidyl ether, glycerol propoxylate triglycidyl ether, polyglycerol polyglycidyl ether, p-aminophenol triglycidyl ether, polypropylene glycol diglycidyl ether, pentaerythritol tetraglycidyl ether, sorbitol polyglycidyl ether, trimethylolpropane trigiycidyl ether, castor oil triglycidyl ether, diaminobiphenyl tetraglycidyl ether, soya oil epoxide, adipic acid, maleic acid, phthalic acid, maleic anhydride, succinic anhydride, dodecylsuccinic anhydride, phthalic anhydride, trimellitic anhydride, pyromellitic anhydride, dimethoxydimethylsilane, diethoxydimethylsilane, toluene diisocyanate, and diphenylmethane diisocyanate.

* * * * *